US012671037B2

(12) United States Patent
Liu et al.

(10) Patent No.: US 12,671,037 B2
(45) Date of Patent: Jun. 30, 2026

(54) ADJUSTABLE CAPACITOR AND ELECTRONIC APPARATUS

(71) Applicant: BOE TECHNOLOGY GROUP CO., LTD., Beijing (CN)

(72) Inventors: Jianxing Liu, Beijing (CN); Jingwen Guo, Beijing (CN); Qianhong Wu, Beijing (CN); Chunxin Li, Beijing (CN); Yunyi Shu, Beijing (CN); Zibo Cao, Beijing (CN); Jianyun Zhao, Beijing (CN); Feng Qu, Beijing (CN); Bigi Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 408 days.

(21) Appl. No.: 18/278,600

(22) PCT Filed: Nov. 14, 2022

(86) PCT No.: PCT/CN2022/131595
    § 371 (c)(1),
    (2) Date: Aug. 23, 2023

(87) PCT Pub. No.: WO2024/103195
    PCT Pub. Date: May 23, 2024

(65) Prior Publication Data
    US 2025/0062076 A1     Feb. 20, 2025

(51) Int. Cl.
    *H01G 7/04*        (2006.01)
    *H01G 5/04*        (2006.01)
    (Continued)

(52) U.S. Cl.
    CPC ................. *H01G 7/04* (2013.01); *H01G 5/04* (2013.01); *H01G 5/06* (2013.01); *H01G 5/14* (2013.01)

(58) Field of Classification Search
    CPC .. H01G 5/04; H01G 5/14; H01G 5/06; H01G 7/04
    See application file for complete search history.

(56) References Cited

U.S. PATENT DOCUMENTS 5,909,078 A * 6/1999 Wood ..................... B81B 3/0024
                                                   310/306
5,959,516 A * 9/1999 Chang ...................... H01G 5/40
                                                   333/197
(Continued)

FOREIGN PATENT DOCUMENTS

CN        1333178 A      1/2002
CN        1409865 A      4/2003
          (Continued)

OTHER PUBLICATIONS

Didong, "Research on Self-calibration Technology of High Precision MEMS Capacitive Accelerometer", Dissertation Submitted to Hangzhou Dianzi University for the Degree of Master, Mar. 2017.

*Primary Examiner* — David M Sinclair
(74) *Attorney, Agent, or Firm* — Nath, Goldberg & Meyer; Joshua B. Goldberg

(57)        ABSTRACT

The present disclosure provides an adjustable capacitor and an electronic apparatus, and relates to the technical field of radio frequency device. The adjustable capacitor of the present disclosure includes a base substrate and at least one capacitor unit on the base substrate, each of the at least one capacitor unit includes a first plate, a second plate and a first connecting arm; the first plate and the connecting arm are on the base substrate; one end of the second plate is connected to the first connecting arm, the second plate and the first plate are opposite to each other, and a certain distance is between the second plate and the first plate.

19 Claims, 4 Drawing Sheets

(51) Int. Cl.
    *H01G 5/06*        (2006.01)
    *H01G 5/14*        (2006.01)

(56)          References Cited

U.S. PATENT DOCUMENTS

| | | | |
|---|---|---|---|
| 6,373,682 | B1 | 4/2002 | Goodwin-Johansson |
| 6,600,644 | B1 | 7/2003 | Chiou et al. |
| 2004/0246653 | A1 * | 12/2004 | Williams ................. H01G 5/14 |
| | | | 361/277 |
| 2005/0013087 | A1 | 1/2005 | Wu et al. |
| 2013/0286534 | A1 | 10/2013 | Ikehashi et al. |
| 2018/0053603 | A1 | 2/2018 | Al-Hazmi et al. |

FOREIGN PATENT DOCUMENTS

| | | | | |
|---|---|---|---|---|
| CN | 1922755 | A | 2/2007 | |
| CN | 102007559 | A | 4/2011 | |
| CN | 103477405 | A | 12/2013 | |
| CN | 108226235 | A * | 6/2018 | ............ G01N 27/22 |
| JP | 2006074020 | A * | 3/2006 | |

* cited by examiner

ADJUSTABLE CAPACITOR AND ELECTRONIC APPARATUS

This is a National Phase Application filed under 35 U.S.C. 371 as a national stage of PCT/CN2022/131595, filed Nov. 14, 2022, the content of which is hereby incorporated by reference in its entirety.

TECHNICAL FIELD

The present disclosure relates to the technical field of radio frequency device, in particular, to an adjustable capacitor and an electronic apparatus.

BACKGROUND

An adjustable capacitor is used as a variable capacitor in a high-frequency tuning circuit and an automatic frequency trimming circuit, in a television, a video recorder, a radio-cassette recorder, or the like, for example for tuning in UHF and VHF bands of a tuner. Most of the currently used adjustable capacitors are varactors, which operate based on the characteristic that a barrier capacitance of a reverse biased PN junction is reduced with increase of an external bias voltage, so that a significant change in voltage is required to achieve sufficient change in capacitance. Therefore, it is an urgent technical problem to provide a novel adjustable capacitor.

SUMMARY

The present disclosure aims to solve at least one technical problem in the prior art, and provides an adjustable capacitor and an electronic apparatus.

In a first aspect, an embodiment of the present disclosure provides an adjustable capacitor, including a base substrate and at least one capacitor unit on the base substrate, where each of the at least one capacitor unit includes a first plate, a second plate and a first connecting arm: the first plate and the connecting arm are on the base substrate; one end of the second plate is connected to the first connecting arm, the second plate and the first plate are opposite to each other, and a certain distance is between the second plate and the first plate:

where the second plate is connected to the first connecting arm through a first elastic component: the first elastic component is configured to deform in response to that an operating environment reaches a specific temperature, such that an area of a region, where orthographic projections of the first plate and the second plate on the base substrates overlap each other, is changed; and/or the capacitor unit further includes a second connecting arm on the base substrate; one end of the first plate is connected to the second connecting arm through a second elastic component, and a certain distance is between the first plate and the base substrate; the second elastic component is configured to deform in response to that the operating environment reaches the specific temperature, such that the area of the region, where the orthographic projections of the first plate and the second plate on the base substrate overlap each other, is changed.

For any one of the at least one capacitor unit, the first connecting arm is spaced apart from the second plate in a first direction: the second plate is connected to the first connecting arm through the first elastic component, the first elastic component is configured to deform in response to that the operating environment reaches the specific temperature and drive the second plate to be displaced along the first direction, such that the area of the region, where the orthographic projections of the first plate and the second plate on the base substrate overlap each other, is changed.

The first elastic component includes a plurality of first elastic sub-members arranged at intervals, two ends of each of the plurality of first elastic sub-members are connected to the first connecting arm and the second plate, respectively, and the first elastic sub-member is configured to stretch or contract along the first direction in response to that the operating environment reaches the specific temperature.

For any one of the at least one capacitor unit, a width of the first plate in the first direction is W1, and a width of the second plate in the first direction is W2: in response to that a temperature of the operating environment does not reach the specific temperature, the region where the orthographic projections of the first plate and the second plate on the base substrate overlap each other is a first region: a width of the first region in the first direction is W3: in response to that the temperature of the operating environment does not reach the specific temperature, a deformation amount of the first elastic component is S1, S1≤W1−W3, and S1≤W2−W3.

For any one of the at least one capacitor unit, the first plate is connected to the second connecting arm through the second elastic component, the second connecting arm is spaced from the first plate in a first direction: the second elastic component is configured to deform in response to that the operating environment reaches the specific temperature and drive the first plate to be displaced along the first direction, such that the area of the region, where the orthographic projections of the first plate and the second plate on the base substrate overlap each other, is changed.

The second elastic component includes a plurality of second elastic sub-members arranged at intervals, two ends of each of the plurality of second elastic sub-members are connected to the second connecting arm and the first plate, respectively, and the second elastic sub-member is configured to stretch or contract along the first direction in response to that the operating environment reaches the specific temperature.

For any one of the at least one capacitor unit, a width of the first plate in the first direction is W1, and a width of the second plate in the first direction is W2: in response to that the temperature of the operating environment does not reach the specific temperature, the region where the orthographic projections of the first plate and the second plate on the base substrate overlap each other is a first region: a width of the first region in the first direction is W3: in response to that the temperature of the operating environment does not reach the specific temperature, a deformation amount of the second elastic component is S2, S2≤W1−W3, and S2≤W2−W3.

For any one of the at least one capacitor unit, the first connecting arm is spaced from the second plate in a first direction: the second plate is connected to the first connecting arm through the first elastic component, the first elastic component is configured to deform in response to that the operating environment reaches the specific temperature and drive the second plate to rotate in a plane parallel to the base substrate, such that the area of the region, where the orthographic projections of the first plate and the second plate on the base substrate overlap each other, is changed.

For any one of the at least one capacitor unit, the first elastic component includes a plurality of first elastic sub-members arranged at intervals, two ends of each of the plurality of first elastic sub-members are connected to the first connecting arm and the second plate, respectively, and the first elastic sub-member is configured such that a radian of the first elastic sub-member changes in response to that the operating environment reaches the specific temperature.

For any one of the at least one capacitor unit, the first elastic component includes a plurality of first elastic sub-members arranged at intervals, two ends of each of the plurality of first elastic sub-members are connected to the first connecting arm and the second plate, respectively, and a part of the plurality of first elastic sub-members are configured such that a radian of the first elastic sub-member changes in response to that the operating environment reaches the specific temperature; and the other part of the plurality of first elastic sub-members are configured to stretch or contract in the first direction in response to that the operating environment reaches the specific temperature.

For any one of the at least one capacitor unit, the first plate is connected to the second connecting arm through the second elastic component, and the second connecting arm is spaced from the first plate in a first direction: the second elastic component is configured to deform in response to that the operating environment reaches the specific temperature and drive the first plate to rotate in a plane parallel to the base substrate, such that the area of the region, where the orthographic projections of the first plate and the second plate on the base substrate overlap each other, is changed.

For any one of the at least one capacitor unit, the second elastic component includes a plurality of second elastic sub-members arranged at intervals, two ends of each of the plurality of second elastic sub-members are connected to the second connecting arm and the first plate, respectively, and the second elastic sub-member is configured such that a radian of the second elastic sub-member changes in response to that the operating environment reaches the specific temperature.

For any one of the at least one capacitor unit, the second elastic component includes a plurality of second elastic sub-members arranged at intervals, two ends of each of the plurality of second elastic sub-members are connected to the second connecting arm and the first plate, respectively, and a part of the plurality of second elastic sub-members are configured such that a radian of the second elastic sub-member changes in response to that the operating environment reaches the specific temperature; and the other part of the plurality of second elastic sub-members are configured to stretch or contract in the first direction in response to that the operating environment reaches the specific temperature.

The adjustable capacitor further includes a package component: where the package component and the base substrate are opposite to each other, to define an accommodating space, and the capacitor unit is packaged in the accommodating space.

The adjustable capacitor further includes a temperature control component on a side of the package component away from the base substrate, where temperature control component is opposite to the at least one capacitor unit.

The first connecting arm includes a first pedestal electrode and a first anchor sequentially stacked in a direction away from the base substrate, and the first elastic component is connected to the first anchor.

The first plate is connected to the second connecting arm through the second elastic component, the second connecting arm includes a second pedestal electrode and a second anchor sequentially stacked in a direction away from the base substrate, and the second elastic component is connected to the second anchor.

The second plate is connected to the first connecting arm through the first elastic component, and the first elastic component is made of a shape memory alloy material.

The first plate is connected to the second connecting arm through the second elastic component, and the second elastic component is made of a shape memory alloy material.

For any one of the at least one capacitor unit, the capacitor unit further includes an interlayer dielectric layer covering the first plate.

A dielectric constant of a material of the interlayer dielectric layer varies with electric field strength.

The at least one capacitor unit includes a plurality of capacitor units, and the first connecting arms of the plurality of capacitor unit are connected together to form a one-piece structure.

In a second aspect, an embodiment of the present disclosure provides an electronic apparatus, which includes any one of the adjustable capacitors described above.

DETAIL DESCRIPTION OF EMBODIMENTS

Figure 1:
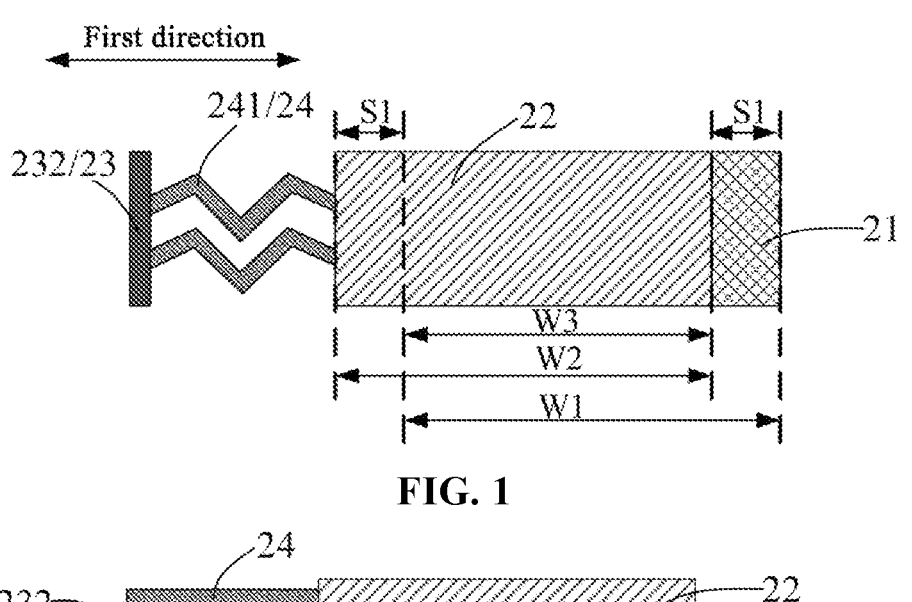
FIG. 1 is a top view of a capacitor unit in a first example of an embodiment of the present disclosure.

In order to enable one of ordinary skill in the art to better understand the technical solutions of the present disclosure, the present disclosure will be further described in detail below with reference to the accompanying drawings and specific embodiments.

Unless defined otherwise, technical or scientific terms used herein shall have the ordinary meaning as understood by one of ordinary skill in the art to which this disclosure belongs. The use of "first", "second", and the like in the present disclosure is not intended to indicate any order, quantity, or importance, but rather serves to distinguish one element from another. Also, the term "a", "an", "the" or the like does not denote a limitation of quantity, but rather denotes the presence of at least one. The word "including", "includes", or the like means that the element or item preceding the word includes the element or item listed after the word and its equivalent, but does not exclude other elements or items. The term "connected", "coupled" or the like is not restricted to physical or mechanical connections, but may include electrical connections, whether direct or indirect. The terms "upper", "lower", "left", "right", and the like are used only to indicate relative positional relationships, and when the absolute position of the object being described is changed, the relative positional relationships may also be changed accordingly.

The Micro-Electro-Mechanical System (MEMS), also known as a micro electromechanical system, a micro system, a micro machine, or the like, refers to a high-tech device having a dimension of a few millimeters or less. The adjustable capacitor in the embodiment of the present disclosure is a MEMS-based capacitor device. A thickness of an air layer between a first plate and a second plate of each capacitor unit in the adjustable capacitor is adjustable, and meanwhile, an area of a region where the first plate and the second plate opposite to each other is also adjustable, so that a wide adjustment range and a high value of quality factor Q of the adjustable capacitor can be realized. The adjustable capacitor is based on a MEMS, and adopts mechanical tuning, where a mechanical resonance frequency of the capacitor is usually in a range from 10 kHz to 100 kHz, and the microwave frequency is more than 10000 times higher than that of the capacitor, so that the capacitor does not respond to a high-frequency radio frequency signal, and noise can be reduced. In addition, compared with a varactor, the adjustable capacitor in the embodiment of the present disclosure adopts a mechanical tuning, and has a driving voltage lower than that of the varactor.

The adjustable capacitor according to an embodiment of the present disclosure is specifically described below.

In a first aspect, an embodiment of the present disclosure provides an adjustable capacitor, which includes a base substrate, and at least one capacitor unit arranged on the base substrate. That is, the adjustable capacitor may include one capacitor unit, or may include a plurality of capacitor units. In a case where the adjustable capacitor includes a plurality of capacitor units, the plurality of capacitor units may be connected in parallel, or in series, or partially connected in series and partially connected in parallel. In a case where the adjustable capacitor includes a plurality of capacitor units, the plurality of capacitor units are connected in parallel only as an example in the embodiment of the present disclosure.

Each capacitor unit in the embodiment of the present disclosures includes a first plate, a second plate, and a first connecting arm. Both of the first plate and the first connecting arm are arranged on the base substrate, one end of the second plate is connected to the first connecting arm and is arranged opposite to the first plate, and a certain distance is between the first plate and the second plate. By controlling a voltage loaded between the first plate and the second plate, an electric field strength between the first plate and the second plate may be controlled, and the second plate may be pulled down toward the first plate under an electrostatic force, so that the distance between the first plate and the second plate can be changed, and the capacitance value of the capacitor unit can be changed. In particular, the capacitor unit according to the embodiment of the present disclosure further satisfies any one of the following cases.

A first case: the second plate is connected to the first connecting arm through a first elastic component, and the first elastic component may be configured to deform in response to that an operating environment reaches a specific temperature, so that an area of a region where orthographic projections of the first plate and the second plate on the base substrate overlap each other is changed. That is, the first elastic component deforms in response to that the operating environment reaches the specific temperature, and may drive the second plate to move so as to change the area of the region where the first plate and the second plate opposite to each other, thereby the capacitance value of the capacitor unit formed by the first plate and the second plate may be changed.

A second case: the capacitor unit includes not only the structure described above, but also a second connecting arm arranged on the base substrate, where one end of the first plate is connected to the second connecting arm through a second elastic component, and a certain distance is between the first plate and the base substrate. The second elastic component is configured to deform in response to that the operating environment reaches a specific temperature, so that an area of a region where orthographic projections of the first plate and the second plate on the base substrate overlap each other is changed. That is, the second elastic component deforms in response to that the operating environment reaches the specific temperature, and may drive the first plate to move so as to change the area of the region where the first plate and the second plate opposite to each other, thereby the capacitance value of the capacitor unit formed by the first plate and the second plate may be changed.

A third case: the second plate is connected to the first connecting arm through the first elastic component, and the capacitor unit includes not only the structure described above, but also a second connecting arm arranged on the base substrate, where one end of the first plate is connected to the second connecting arm through a second elastic component, and a certain distance is between the first plate and the base substrate. The first elastic component and the second elastic component are both configured to deform in response to that the operating environment reaches a specific temperature, so that an area of a region where orthographic projections of the first plate and the second plate on the base substrate overlap each other is changed. That is, the first elastic component deforms in response to that the operating environment reaches the specific temperature, and may drive the second plate move, and the second elastic component deforms in response to that the operating environment reaches the specific temperature, and may drive the first plate move. Through the movement of first plate and second plate, the area of the region where the first plate and the second plate opposite to each other is changed, so that the capacitance value of the capacitor unit formed by the first plate and the second plate is changed.

In summary, for the adjustable capacitor provided by the embodiment of the present disclosure, in each capacitor unit, the capacitance value of the adjustable capacitor can be adjusted not only by changing the distance between the first plate and the second plate, but also by changing the area of the region where the first plate and the second plate opposite to each other. Therefore, the capacitance value of the adjustable capacitor can be adjusted more accurately, and a wider adjustment range can be realized.

It should be noted that, both of the first elastic component and the second elastic component deform from an initial state in response to that the operating environment reaches a specific temperature, and the deformed first elastic component and the deformed second elastic component will return to the initial state in response to that the operating environment is modulated to a non-specific temperature. For example, both of the first elastic component and the second elastic component are made of a shape memory alloy material. Furthermore, the shape memory alloy material may be a shape memory alloy of an aluminum-copper alloy.

In some examples, to prevent the second plate from shorting with the first plate when being pulled down under the electrostatic force, the first plate is covered with an interlayer dielectric layer on a side the first plate away from the base substrate. For example, the interlayer dielectric layer is made of silicon nitride. Alternatively, the interlayer dielectric layer may be made of a material with a dielectric constant varying with electric field strength.

In some examples, the first connecting arm may include a first pedestal electrode and a first anchor sequentially stacked in a direction away from the base substrate, where the first elastic component is connected to the first anchor. Furthermore, in a case where the first plate is arranged on the base substrate, the first pedestal electrode may be arranged in the same layer and made of the same material as the first plate. As such, the first plate and the first pedestal electrode may be formed through one patterning process.

In some examples, the second connecting arm includes a second pedestal electrode and a second anchor sequentially stacked in a direction away from the base substrate, where the second elastic component is connected to the second anchor. In a case where the first connecting arm may include the first pedestal electrode and the first anchor that are sequentially stacked in the direction away from the base substrate, the second pedestal electrode and the first pedestal electrode may be arranged in the same layer and made of the same material, and thus, the first pedestal electrode and the second pedestal electrode may be formed in one patterning process. In this case, a height of the first anchor is greater than that of the second anchor, so as to ensure that a certain distance is kept between the second plate and the first plate.

In some examples, a reverse stress layer is further arranged between the base substrate and the capacitor unit. In one example, the reverse stress layer may be made of silicon oxide or silicon nitride.

In order to make the specific structure of each capacitor unit in the embodiment of the present disclosure more clear, the capacitor unit in the embodiment of the present disclosure is described below with reference to specific examples.

Figure 2:
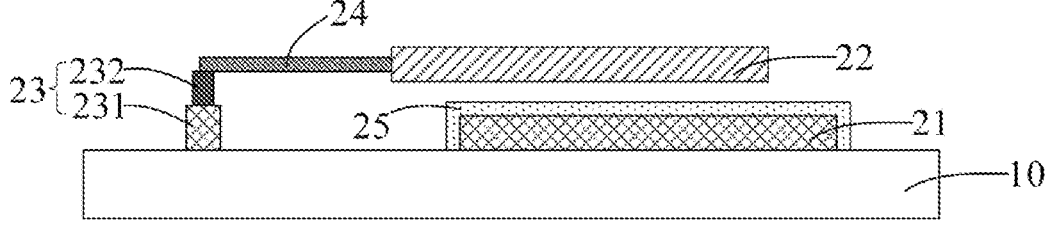
FIG. 2 is a cross-sectional view of a capacitor unit in a first example of an embodiment of the present disclosure.

A first example is as follows. FIG. 1 is a top view of a capacitor unit in a first example of an embodiment of the present disclosure; and FIG. 2 is a cross-sectional view of a capacitor unit in a first example of an embodiment of the present disclosure. Referring to FIGS. 1 and 2, a first plate 21 and a first connecting arm 23 of the capacitor unit are arranged side by side along a first direction on a base substrate 10 and spaced apart from each other, one end of a second plate 22 is connected to the first connecting arm 23 through a first elastic component 24, and the first plate 21 is covered with an interlayer dielectric layer 25 on a side of the first plate 21 away from the base substrate 10. The first elastic component 24 is configured to deform in response to that the operating environment reaches a specific temperature, and drive the second plate 22 to be displaced along the first direction, so that an area of a region, where orthographic projections of the first plate 21 and the second plate 22 on the base substrate 10 overlap each other, is changed.

As an example, the first elastic component 24 stretches in response to that the temperature of the operating environment reaches the specific temperature. With continued reference to FIG. 1, the first plate 21 has a width W1 in the first direction, and the second plate 22 has a width W2 in the first direction. In response to that the temperature of the operating environment does not reach the specific temperature, the first elastic component 24 is in an initial state, the region where the orthographic projections of the first plate 21 and the second plate 22 on the base substrate 10 overlap each other is a first region, a width of the first region in the first direction is W3. In response to that the temperature of the operating environment does not reach the specific temperature, a deformation amount of the first elastic component 24 is S, S≤W1−W3, and S≤W2−W3. That is, regions where the orthographic projections of the first electrode and the second electrode on the base substrate 10 do not overlap each other are a second region and a third region, respectively, a width of the second region in the first direction is W1−W3, a width of the third region in the first direction is W2−W3, and the deformation amount S of the first elastic component 24 cannot be greater than either the width of the second region in the first direction or the width of the third region in the first direction.

With reference to FIG. 1, the first elastic component 24 includes a plurality of first elastic sub-members 241 arranged at intervals, and two ends of each first elastic sub-member 241 are connected to the first connecting arm 23 and the second plate 22, respectively. The first elastic sub-member 241 is configured to stretch or contract along the first direction in response to that the operating environment reaches a specific temperature, to drive the second plate 22 to be displaced along the first direction. The reason why the first elastic component 24 in the embodiment of the present disclosure adopts a structure formed by a plurality of first elastic sub-members 241 is to stably support the second plate 22. In FIG. 1, it is only as an example that the first elastic component 24 includes two first elastic sub-members 241, and it should be understood that in an actual product, a corresponding number of first elastic sub-members 241 may be designed according to the size of the second plate 22. Furthermore, the first elastic sub-member 241 may be of a spring-like structure.

Correspondingly, an embodiment of the present disclosure further provides a manufacturing method of the capacitor unit described above, where the first connecting arm 23 includes a first pedestal electrode 231 and a first anchor 232 which are sequentially arranged along a direction away from the base substrate 10. The manufacturing method specifically includes the following steps S11 to S18.

S11, forming the reverse stress layer on the base substrate 10.

In some examples, step S11 may include forming the reverse stress layer on the base substrate 10, through Chemical Vapor Deposition (CVD).

S12, forming the first plate 21 and the first pedestal electrode 231 of the capacitor unit on a side of the reverse stress layer away from the base substrate 10.

In some examples, step S12 may include: forming a first metal film as a seed layer through, including but not limited to, PVD (Physical Vapor Deposition), then electroplating the seed layer, and finally coating a photoresist, exposing and developing the photoresist, and etching (for example, wet etching) the first metal film to form a pattern including the first plate 21 and the first pedestal electrode 231.

S13, forming the interlayer dielectric layer 25 on a side of the first electrode away from the base substrate 10.

In some examples, step S13 may include, but is not limited to, forming the interlayer dielectric layer 25 through chemical vapor deposition.

S14, forming a sacrificial layer on a side of the interlayer dielectric layer 25 away from the base substrate 10.

In some examples, the step S14 may include: forming the sacrificial layer, through plasma enhanced chemical vapor deposition, low pressure chemical vapor deposition, atmospheric pressure chemical vapor deposition, or electron cyclotron resonance chemical vapor deposition or sputtering; and patterning the sacrificial layer to expose the first pedestal electrode 231.

S15, forming a first partial structure of the first anchor 232 and a first partial structure of the second plate 22 on a side of the first pedestal electrode 231 away from the base substrate 10.

In some examples, step S15 may include: forming a second conductive film though, including but not limited to, magnetron sputtering: then coating a photoresist, exposing and developing the photoresist, and etching (for example, wet etching) the second conductive film to form the first partial structure of the first anchors 232 and the first partial structure of the second plate 22. Finally, removing the photoresist.

S16, forming the first elastic component 24 on a side of the first partial structure of the first anchor 232 and the first partial structure of the second plate 22 away from the base substrate 10, where two ends of the first elastic component 24 lap with the first partial structure of the first anchor 232 and the first partial structure of the second plate 22, respectively.

S17, forming a second partial structure of the first anchor 232 and a second partial structure of the second plate 22 on a side of the first elastic component 24 away from the base substrate 10, where the first partial structure and the second partial structure of the first anchor 232 are stacked together to fix one end of the first elastic component 24, and the first partial structure and the second partial structure of the second plate 22 are stacked together to fix the other end of the first elastic component 24.

In some examples, step S17 may include: forming a second conductive film through, including but not limited to, magnetron sputtering: then coating a photoresist, exposing and developing the photoresist, and etching (for example, wet etching) the second conductive film to form the second partial structure of the first anchors 232 and the second partial structure of the second plate 22. Finally, removing the photoresist.

S18, removing the sacrificial layer.

In some examples, step S18 may include performing a precisely controlled etching on the sacrificial layer under the second plate 22 and the first elastic component 24, through adopting Reactive Ion Etching (RIE), reasonably controlling gas atmosphere (lateral etching strength), pressure, power (etching rate), etching time, and the like, to remove the sacrificial layer 60 under the membrane bridge, to complete the manufacturing of the MEMS device. The gas atmosphere is $SF_6$ gas.

Figure 3:
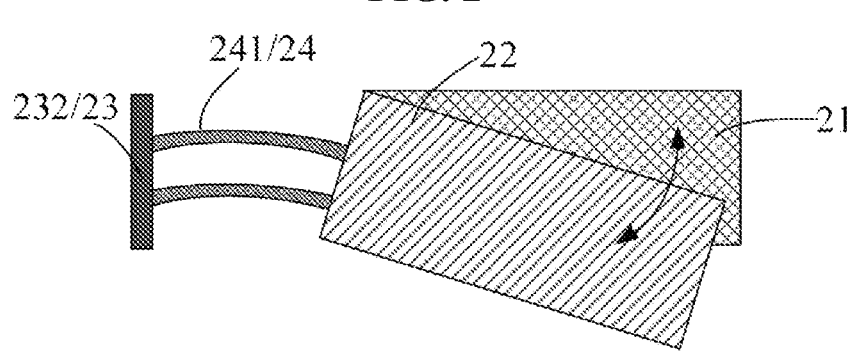
FIG. 3 is a top view of a capacitor unit in a second example of an embodiment of the present disclosure.
Figure 4:
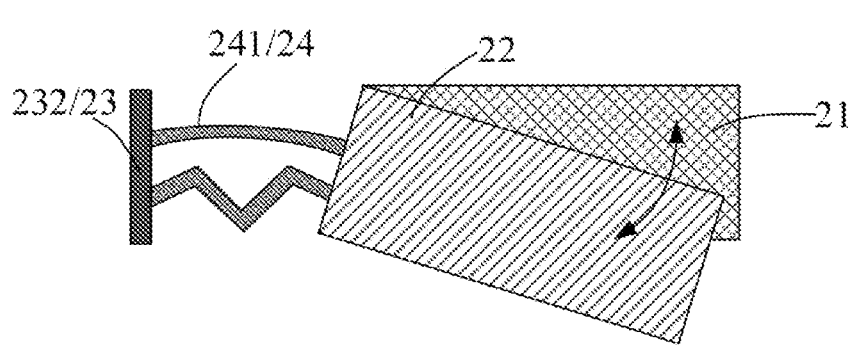
FIG. 4 is a top view of another capacitor unit in a second example of an embodiment of the present disclosure.

A second example is as follows. FIG. 3 is a top view of a capacitor unit in a second example of an embodiment of the present disclosure; and FIG. 4 is a top view of another capacitor unit in a second example of an embodiment of the present disclosure. As shown in FIGS. 3 and 4, this example is substantially the same in structure as the first example except for the first elastic component 24 in the capacitor unit for connecting the first connecting arm 23 and the second plate 22. In this example, the first elastic component 24 is configured to deform according to the temperature of the operating environment, and drive the second plate 22 to rotate in a plane parallel to the base substrate 10. That is, the first elastic component 24 may drive the second plate 22 to move clockwise or counterclockwise in the plane parallel to the base substrate 10. In this way, the area of the region where the orthographic projections of the first plate 21 and the second plate 22 on the base substrate 10 overlap each other is changed.

In one example, as shown in FIG. 3, the first elastic component 24 may include a plurality of first elastic sub-members 241 arranged at intervals, and two ends of each first elastic sub-member 241 are connected to the first connecting arm 23 and the second plate 22, respectively. The first elastic sub-member 241 is configured such that an radian of the first elastic sub-member 241 changes in response to that the operating environment reaches a specific temperature, and the first elastic sub-member 241 drives the second plate 22 to rotate in a plane parallel to the base substrate 10, so that an area of a region, where orthographic projections of the first plate 21 and the second plate 22 on the base substrate 10 overlap each other, is changed. For example, as shown in FIG. 3, in response to that the operating environment reaches a specific temperature, the first elastic sub-member 241 has a reduced radian (reduced bending degree), and drives the second plate 22 to rotate counterclockwise in the plane parallel to the base substrate 10, to increase the area of the region where the orthographic projections of the first plate 21 and the second plate 22 on the base substrate 10 overlap each other. Similarly, the first elastic sub-member 241 has an increased radian (increased bending degree) in response to that the operating environment reaches a specific temperature, and drives the second plate 22 to rotate clockwise in the plane parallel to the base substrate 10, so that the area of the region, where the orthographic projections of the first plate 21 and the second plate 22 on the base substrate 10 overlap each other, is reduced.

It should be noted that, in FIG. 3, only two first elastic sub-members 241 are taken as an example, and in an actual product, a corresponding number of first elastic sub-members 241 may be designed according to the size of the second plate 22. Furthermore, the first elastic sub-member 241 may be of an arc-shaped structure.

In another example, as shown in FIG. 4, the first elastic component 24 may include a plurality of first elastic sub-members 241 arranged at intervals, and two ends of each first elastic sub-member 241 are connected to the first connecting arm 23 and the second plate 22, respectively. A part of the plurality of first elastic sub-members 241 are configured such that a radian of the first elastic sub-members 241 changes in response to that the operating environment reaches a specific temperature; and the other part of the plurality of first elastic sub-members 241 are configured to stretch or contract in the first direction in response to that the operating environment reaches the specific temperature.

In this case, in response to that the operating environment reaches the specific temperature, the second plate 22 is driven to rotate by the first elastic sub-member 241 with the changed radian, the first elastic sub-member 241 which stretches or contracts along the first direction in response to that the operating environment reaches the specific temperature may provide a moving force for the second plate 22, so that the second plate 22 is ensured to stably move to a corresponding position, therefore the adjustment of the area of the region where the first plate 21 and the second plate 22 opposite to each other is realized, and the adjustment of the capacitance value of the capacitor unit is realized.

It should be noted that, in FIG. 4, only two first elastic sub-members 241 are taken as an example, where one of the two first elastic sub-members 241 is of an arc-shaped structure, and the other of the two first elastic sub-members 241 is of a spring-like structure. A relative position between the first elastic sub-member 241 having the arc-shaped structure and the first elastic sub-member 241 having the spring-like structure, depend on whether the radian of the first elastic sub-member 241 having the arc-shaped structure increases or decreases in response to that the operating environment reaches a specific temperature and whether the first elastic sub-member 241 having the spring-like structure extends or contracts in response to that the operating environment reaches the specific temperature. It may be specifically designed in an actual product according to the two kinds of first elastic sub-members 241. Furthermore, the number of the first elastic sub-members 241 may be specifically designed in an actual product.

For the manufacturing process of the capacitor unit in the second example, the same manufacturing process as that in the first example may be adopted, and thus, the description is not repeated here.

Figure 5:
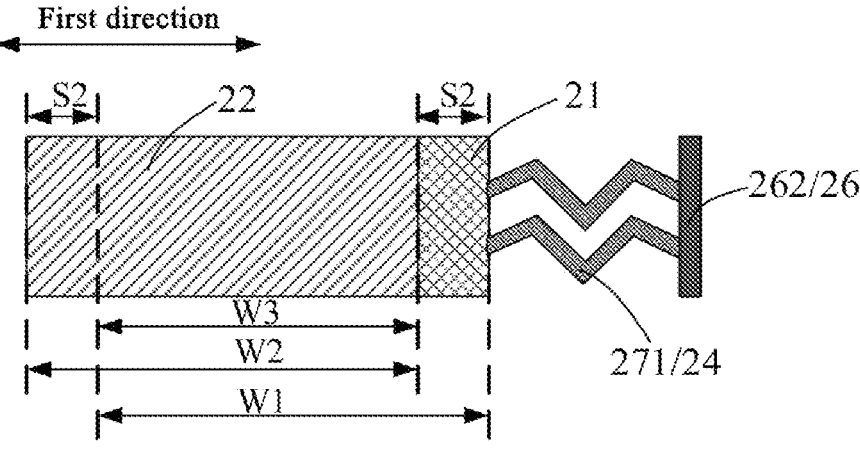
FIG. 5 is a top view of a capacitor unit in a third example of an embodiment of the present disclosure.
Figure 6:
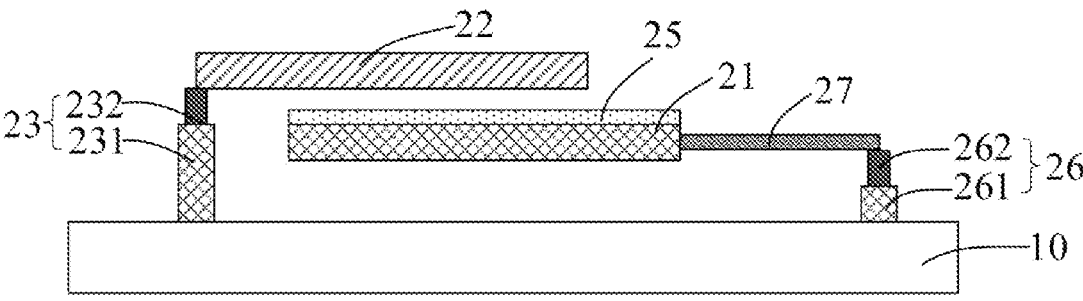
FIG. 6 is a cross-sectional view of a capacitor unit in a third example of an embodiment of the present disclosure.

A third example is as follows. FIG. 5 is a top view of a capacitor unit in a third example of an embodiment of the present disclosure; and FIG. 6 is a cross-sectional view of a capacitor unit in a third example of an embodiment of the present disclosure. As shown in FIGS. 5 and 6, in this example, the capacitor unit includes a first connecting arm 23, a second connecting arm 26, a first plate 21, a second plate 22, and a second elastic component 27 arranged on the first substrate 10. One end of the first connecting arm 23 away from the base substrate 10 is connected to the second plate 22, one end of the first plate 21 is connected to one end of the second connecting arm 26 away from the base substrate 10 through the second elastic component 27, the first plate 21 and the second plate 22 are arranged opposite to each other, and the first plate 21 is closer to the base substrate 10 than the second plate 22. A surface of the first plate 21 close to the second plate 22 is covered with an interlayer dielectric layer 25. In this example, the second plate 22 is fixedly arranged with respect to the base substrate 10, that is, a position thereof will not change. The second elastic component 27 is configured to deform in response to that the operating environment reaches a specific temperature, and drive the first plate 21 to be displaced along a first direction, so that an area of a region, where orthographic projections of the first plate 21 and the second plate 22 on the base substrate 10 overlap each other, is changed.

The second connecting arm 26 includes a second pedestal electrode 261 and a second anchor 262 which are sequentially stacked along a direction away from the base substrate 10, and the second elastic component 27 is connected to the second anchor 262.

It is taken as an example that the second elastic component 27 stretches in response to that the temperature of the operating environment reaches a specific temperature. As shown in FIG. 5, the first plate 21 has a width W1 in the first direction, and the second plate 22 has a width W2 in the first direction. In response to that the temperature of the operating environment does not reach the specific temperature, the second elastic component 27 is in an initial state, the region where the orthographic projections of the first plate 21 and the second plate 22 on the base substrate 10 overlap each other is a first region, and a width of the first region in the first direction is W3. In response to that the temperature of the operating environment does not reach the specific temperature, a deformation amount of the second elastic component 27 is S2, $S2 \leq W1-W3$, and $S2 \leq W2-W3$. That is, regions where the orthographic projections of the first electrode and the second electrode on the base substrate 10 do not overlap each other are a second region and a third region, respectively, a width of the second region in the first direction is W1−W3, a width of the third region in the first direction is W2−W3, and the deformation amount S2 of the second elastic component 27 cannot be greater than either the width of the second region in the first direction or the width of the third region in the first direction.

In this example, the second elastic component 27 may adopt the same structure as the first elastic component 24. For example, the second elastic component 27 includes a plurality of second elastic sub-members 271 arranged at intervals, and two ends of each of the second elastic sub-members 271 are connected to the second connecting arm 26 and the first plate 21, respectively. The second elastic sub-member 271 is configured to stretch or contract along the first direction in response to that the operating environment reaches a specific temperature, and drive the first plate 21 to be displaced along the first direction, so that the area of the region, where the orthographic projections of the first plate 21 and the second plate 22 on the base substrate 10 overlap each other, is changed. The reason why the second elastic component 27 in the embodiment of the present disclosure adopts a structure formed by a plurality of second elastic sub-members 271 is to stably support the first plate 21. In FIG. 5, it is only as an example that the second elastic component 27 includes two second elastic sub-members 271, and it should be understood that in an actual product, a corresponding number of second elastic sub-members 271 may be designed according to the size of the first plate 21. Furthermore, the second elastic sub-member 271 may be of a spring-like structure.

For the manufacturing process of the capacitor unit in the third example, the same manufacturing process as that in the first example may be adopted, and thus, the description is not repeated here.

Figure 7:
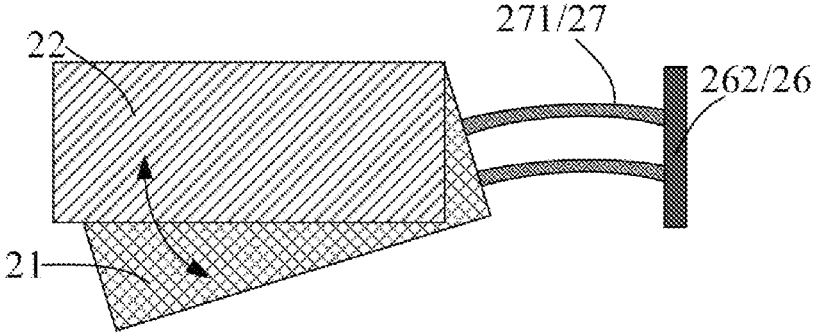
FIG. 7 is a top view of a capacitor unit in a fourth example of an embodiment of the present disclosure.
Figure 8:
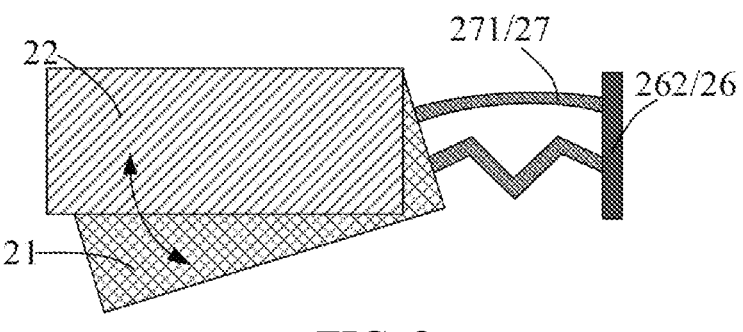
FIG. 8 is a top view of another capacitor unit in a fourth example of an embodiment of the present disclosure.

A fourth example is as follows. FIG. 7 is a top view of a capacitor unit in a fourth example of an embodiment of the present disclosure; and FIG. 8 is a top view of another capacitor unit in a fourth example of an embodiment of the present disclosure. As shown in FIGS. 7 and 8, this example is substantially the same as the third example structure except for the second elastic component 27 in the capacitor unit for connecting the second connecting arm 26 and the first plate 21. The second elastic component 27 may have the same structure as the first elastic component 24 in the second example. In this example, the second elastic component 27 is configured to deform according to the temperature of the operating environment, and drive the first plate 21 to rotate in a plane parallel to the base substrate 10. That is, the second elastic component 27 may drive the first plate 21 to move clockwise or counterclockwise in the plane parallel to the base substrate 10. In this way, the area of the region where the orthographic projections of the first plate 21 and the second plate 22 on the base substrate 10 overlap each other is changed.

In one example, as shown in FIG. 7, the second elastic component 27 may include a plurality of second elastic sub-members 271 arranged at intervals, and two ends of each second elastic sub-member 271 are connected to the second connecting arm 26 and the first plate 21, respectively. The second elastic sub-member 271 is configured such that a radian of the second elastic sub-member 271 changes in response to that an operating environment reaches a specific temperature, and the second elastic sub-member 271 drives the first plate 21 to rotate in a plane parallel to the base substrate 10, so that an area of a region, where orthographic projections of the first plate 21 and the second plate 22 on the base substrate 10 overlap each other, is changed. For example, as shown in FIG. 7, in response to that the operating environment reaches a specific temperature, the second elastic sub-member 271 has a reduced radian (reduced bending degree), and drives the first plate 21 to rotate counterclockwise in the plane parallel to the base substrate 10, to increase the area of the region where the orthographic projections of the first plate 21 and the second plate 22 on the base substrate 10 overlap each other. Similarly, the first elastic sub-member 241 has an increased radian (increased bending degree) in response to that the operating environment reaches a specific temperature, and drives the first plate 21 to rotate clockwise in the plane parallel to the base substrate 10, so that the area of the region, where the orthographic projections of the first plate 21 and the second plate 22 on the base substrate 10 overlap each other, is reduced.

It should be noted that, in FIG. 7, only two second elastic sub-members 271 are taken as an example, and in an actual product, a corresponding number of second elastic sub-members 271 may be designed according to the size of the first plate 21. Furthermore, the second elastic sub-member 271 may be of an arc-shaped structure.

In another example, as shown in FIG. 8, the second elastic component 27 may include a plurality of second elastic sub-members 271 arranged at intervals, and two ends of each second elastic sub-member 271 are connected to the second connecting arm 26 and the first plate 21, respectively. A part of the plurality of second elastic sub-members 271 are configured such that a radian of the second elastic sub-members 271 changes in response to that the operating environment reaches a specific temperature; and the other part of the plurality of second elastic sub-members 271 are configured to stretch or contract in the first direction in response to that the operating environment reaches the specific temperature. In this case, in response to that the operating environment reaches the specific temperature, the first plate 21 is driven to rotate by the second elastic sub-member 271 with the changed radian, the second elastic sub-member 271 which stretches or contracts along the first direction in response to that the operating environment reaches the specific temperature may provide a moving force for the first plate 21, so that the first plate 21 is ensured to stably move to a corresponding position, therefore the adjustment of the area of the region where the first plate 21 and the second plate 22 opposite to each other is realized, and the adjustment of the capacitance value of the capacitor unit is realized.

It should be noted that, in FIG. 8, only two second elastic sub-members 271 are taken as an example, where one of the two second elastic sub-members 271 is of an arc-shaped structure, and the other of the two the second elastic sub-members is of a spring-like structure. A relative position between the second elastic sub-member 271 having the arc-shaped structure and the second elastic sub-member 271 having the spring-like structure, depends on whether the radian of the second elastic sub-member 271 having the arc-shaped structure increases or decreases in response to that the operating environment reaches a specific temperature and whether the second elastic sub-member 271 having the spring-like structure extends or contracts in response to that the operating environment reaches the specific temperature. It may be specifically designed in an actual product according to the two kinds of second elastic sub-members 271. Furthermore, the number of the second elastic sub-members 271 may be specifically designed in an actual product.

For the manufacturing process of the capacitor unit in the fourth example, the same manufacturing process as that in the first example may be adopted, and thus, the description is not repeated here.

Figure 9:
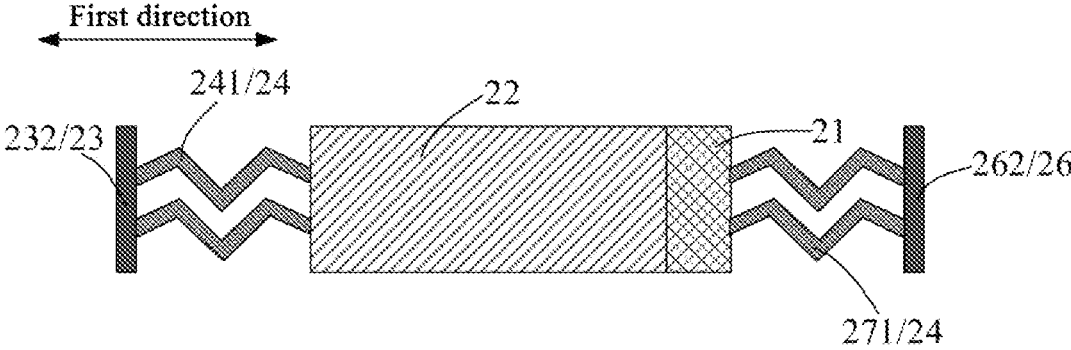
FIG. 9 is a top view of a capacitor unit in a fifth example of an embodiment of the present disclosure.
Figure 10:
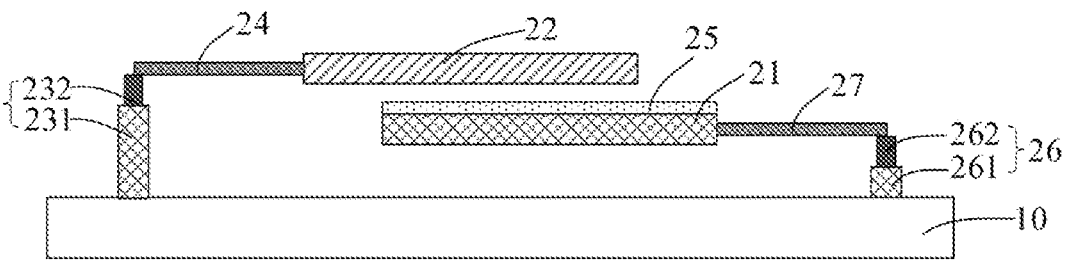
FIG. 10 is a cross-sectional view of a capacitor unit in a fifth example of an embodiment of the present disclosure.

A fifth example is as follows. FIG. 9 is a top view of a capacitor unit in a third example of an embodiment of the present disclosure; and FIG. 10 is a cross-sectional view of a capacitor unit in a third example of an embodiment of the present disclosure. As shown in FIGS. 9 and 10, in this example, the capacitor unit includes a first connecting arm 23, a second connecting arm 26, a first plate 21, a second plate 22, a first elastic component 24, and a second elastic component 27 arranged on the first substrate 10. One end of the first connecting arm 23 away from the base substrate 10 is connected to the second plate 22 through the first connecting arm 23, one end of the first plate 21 is connected to one end of the second connecting arm 26 away from the base substrate 10 through the second elastic component 27, the first plate 21 and the second plate 22 are arranged opposite to each other, and the first plate 21 is closer to the base substrate 10 than the second plate 22. A surface of the first plate 21 close to the second plate 22 is covered with an interlayer dielectric layer 25. In this example, the first elastic component 24 is configured to deform in response to that the operating environment reaches a specific temperature, and drive the second plate 22 to be displaced along the first direction, so that the area of the region, where the orthographic projections of the first plate 21 and the second plate 22 on the base substrate 10 overlap each other, is changed. The second elastic component 27 is configured to deform in response to that the operating environment reaches a specific temperature, and drive the first plate 21 to be displaced along the first direction, so that an area of a region where orthographic projections of the first plate 21 and the second plate 22 on the base substrate 10 overlap each other, is changed. That is, in the embodiment of the present disclosure, both of the first plate 21 and the second plate 22 may be displaced along the first direction under a specific condition, to adjust the area of the region where the two plates opposite to each other, so as to achieve adjustment of capacitance value of the capacitor unit. In this case, an adjustment range of capacitance value of the capacitor unit is improved.

The first elastic component 24 in this example may employ the first elastic component 24 in the first example, that is, the first elastic component 24 composed of a plurality of first elastic sub-members 241 arranged at intervals. The second elastic component 27 may employ the second elastic component 27 in the third example, that is, the second elastic component 27 composed of a plurality of second elastic sub-members 271 arranged at intervals. In FIG. 9, it is only taken as an example that the first elastic component 24 includes two first elastic sub-members 241, and the second elastic component 27 includes two second elastic sub-members 271. The first elastic sub-member 241 is the same as that in the first example, and the second elastic sub-member 271 is the same as that in the third example and thus, the description is not repeated here.

For the manufacturing process of the capacitor unit in the fifth example, the same manufacturing process as that in the first example may be adopted, and thus, the description is not repeated here.

Figure 11:
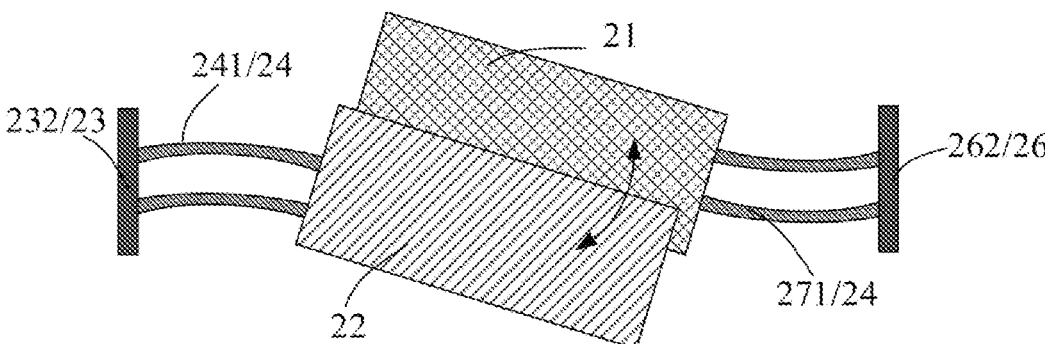
FIG. 11 is a top view of a capacitor unit in a sixth example of an embodiment of the present disclosure.
Figure 12:
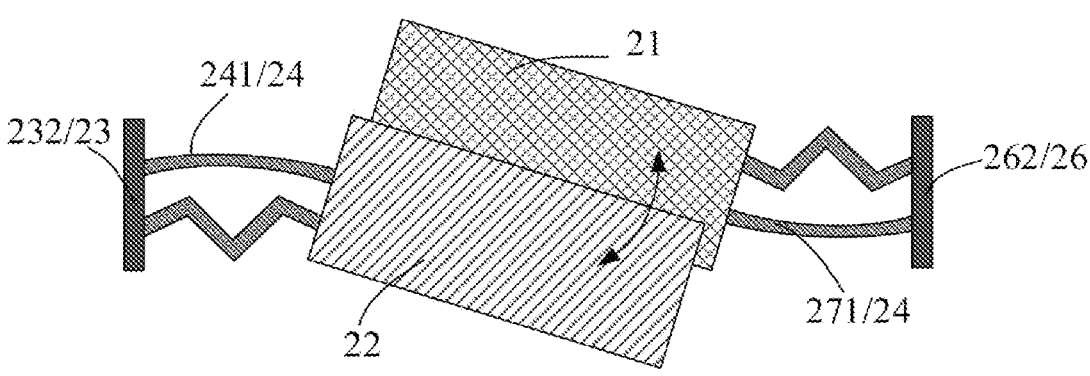
FIG. 12 is a top view of another capacitor unit in a sixth example of an embodiment of the present disclosure.

A sixth example is as follows. FIG. 11 is a top view of a capacitor unit in a sixth example of an embodiment of the present disclosure; and FIG. 12 is a top view of another capacitor unit in a sixth example of an embodiment of the present disclosure. As shown in FIGS. 11 and 12, the capacitor unit structure in this example is substantially the same as that in the fifth example, except for the first elastic component 24 and the second elastic component 27. The first elastic component 24 is configured to deform according to the temperature of the operating environment, and drive the second plate 22 to rotate in a plane parallel to the base substrate 10, that is, the first elastic component 24 may drive the second plate 22 to move clockwise or counterclockwise in the plane parallel to the base substrate 10; and the second elastic component 27 is configured to deform in response to that the temperature of the operating environment reaches a specific temperature, and drive the first plate 21 to be displaced along the first direction, so that an area of a region, where orthographic projections of the first plate 21 and the second plate 22 on the base substrate 10 overlap each other, is changed. That is, in the embodiment of the present disclosure, both of the first plate 21 and the second plate 22 may rotate in the plane parallel to the base substrate 10 under a specific condition, to adjust the area of the region where the two plates opposite to each other, thereby realizing the adjustment of capacitance value of the capacitor unit. In this case, an adjustment range of the capacitance value of the capacitor unit is improved.

The first elastic component 24 in this example may employ the first elastic component 24 in the second example, that is, the first elastic component 24 composed of a plurality of first elastic sub-members 241 arranged at intervals. The second elastic component 27 may employ the second elastic component 27 in the fourth example, that is, the second elastic component 27 composed of a plurality of second elastic sub-members 271 arranged at intervals. In FIGS. 11 and 12, it is only taken as an example that the first elastic component 24 includes two first elastic sub-members 241, and the second elastic component 27 includes two second elastic sub-members 271. The first elastic sub-member 241 is the same as that in the second example, and the second elastic sub-member 271 is the same as that in the fourth example, and thus, the description is not repeated here.

For the manufacturing process of the capacitor unit in the sixth example, the same manufacturing process as that in the first example may be adopted, and thus, the description is not repeated here.

Figure 13:
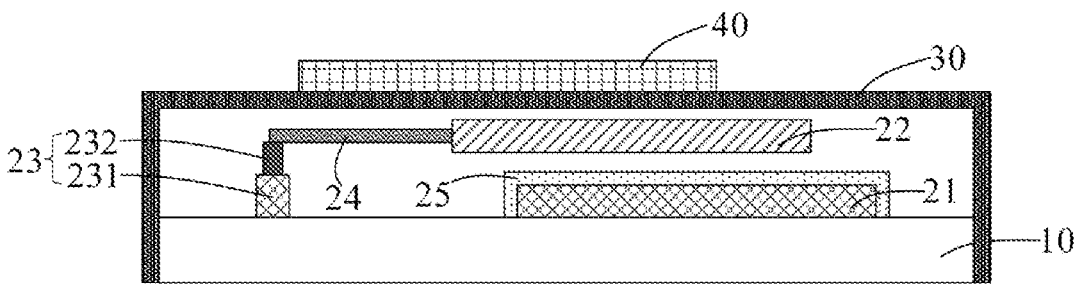
FIG. 13 is a cross-sectional view of an adjustable capacitor according to an embodiment of the present disclosure.

FIG. 13 is a cross-sectional view of an adjustable capacitor according to an embodiment of the present disclosure. As shown in FIG. 13, no matter which of the above structures is adopted by the capacitor unit in the adjustable capacitor, the adjustable capacitor in the embodiment of the present disclosure may include a package component 30, the package component 30 and the base substrate 10 define an accommodating space, and the capacitor unit is located in the accommodating space.

In some examples, with continued reference to FIG. 13, a temperature control component 40 is arranged on a side of the package component 30 away from the base substrate 10, and the temperature control component 40 is arranged opposite to a respective capacitor unit. In one example, the temperature control component 40 may be a heating wire or the like, and a temperature of the temperature control component 40 may be adjusted by applying a voltage to the temperature control component 40, so that a temperature of the operating environment of the adjustable capacitor reaches a specific temperature.

Figure 14:
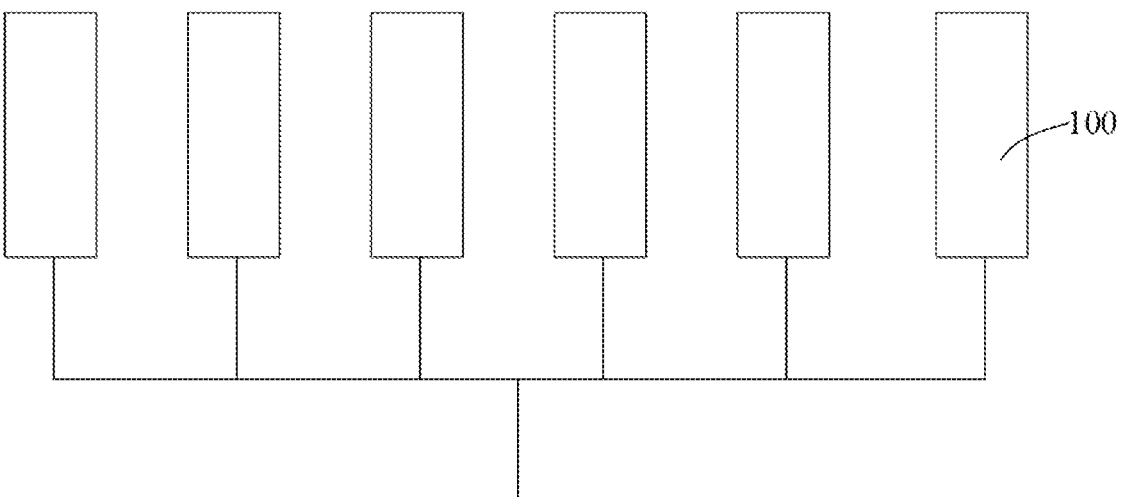
FIG. 14 is a schematic diagram of an adjustable capacitor according to an embodiment of the present disclosure.

In some examples, FIG. 14 is a schematic diagram of an adjustable capacitor according to an embodiment of the present disclosure. As shown in FIG. 14, a plurality of capacitor units 100 in the adjustable capacitor are connected in parallel, and in this case, the first connecting arms 23 may be connected together to form a one-piece structure, so that the manufacturing is facilitated.

In a second aspect, an embodiment of the present disclosure provides an electronic apparatus, where the electronic apparatus includes any one of the adjustable capacitors described above. The electronic apparatus in the embodiment of the present disclosure may be a television, a video recorder or a radio cassette recorder, and the adjustable capacitor may be used in a high-frequency tuning circuit and an automatic frequency fine tuning circuit. For example, the adjustable capacitor may be used for tuning in UHF and VHF bands of a tuner.

It will be understood that the above embodiments are merely exemplary embodiments adopted to illustrate the principles of the present disclosure, and the present disclosure is not limited thereto. It will be apparent to one of ordinary skill in the art that various modifications and improvements can be made without away from the spirit and essence of the present disclosure, and such modifications and improvements are also considered to be within the scope of the present disclosure.

What is claimed is:

1. An adjustable capacitor, comprising a base substrate and at least one capacitor unit on the base substrate, wherein each of the at least one capacitor unit comprises a first plate, a second plate and a first connecting arm; the first plate and the first connecting arm are on the base substrate; one end of the second plate is connected to the first connecting arm, the second plate and the first plate are opposite to each other, and a certain distance is between the second plate and the first plate;

wherein the second plate is connected to the first connecting arm through a first elastic component; the first elastic component is configured to deform in response to that an operating environment reaches a specific temperature, such that an area of a region, where orthographic projections of the first plate and the second plate on the base substrates overlap each other, is changed; and/or the capacitor unit further comprises a second connecting arm on the base substrate; one end of the first plate is connected to the second connecting arm through a second elastic component, and a certain distance is between the first plate and the base substrate; the second elastic component is configured to deform in response to that the operating environment reaches the specific temperature, such that the area of the region, where the orthographic projections of the first plate and the second plate on the base substrate overlap each other, is changed, wherein the adjustable capacitor further comprises a package component; wherein the package component and the base substrate are opposite to each other, to define an accommodating space, and the capacitor unit is packaged in the accommodating space, and the adjustable capacitor further comprises a temperature control component on a side of the package component away from the base substrate, wherein the temperature control component is opposite to the at least one capacitor unit.

2. The adjustable capacitor according to claim 1, wherein for any one of the at least one capacitor unit, the first connecting arm is spaced apart from the second plate in a first direction; the second plate is connected to the first connecting arm through the first elastic component, the first elastic component is configured to deform in response to that the operating environment reaches the specific temperature and drive the second plate to be displaced along the first direction, such that the area of the region, where the orthographic projections of the first plate and the second plate on the base substrate overlap each other, is changed.

3. The adjustable capacitor according to claim 2, wherein the first elastic component comprises a plurality of first elastic sub-members arranged at intervals, two ends of each of the plurality of first elastic sub-members are connected to the first connecting arm and the second plate, respectively, and the first elastic sub-member is configured to stretch or contract along the first direction in response to that the operating environment reaches the specific temperature.

4. The adjustable capacitor according to claim 2, wherein for any one of the at least one capacitor unit, a width of the first plate in the first direction is W1, and a width of the second plate in the first direction is W2; in response to that a temperature of the operating environment does not reach the specific temperature, the region where the orthographic projections of the first plate and the second plate on the base substrate is a first region; a width of the first region in the first direction is W3; in response to that the temperature of the operating environment does not reach the specific temperature, a deformation amount of the first elastic component is S1, S1≤W1−W3, and S1≤W2−W3.

5. The adjustable capacitor according to claim 1, wherein for any one of the at least one capacitor unit, the first plate is connected to the second connecting arm through the second elastic component, the second connecting arm is spaced from the first plate in a first direction; the second elastic component is configured to deform in response to that the operating environment reaches the specific temperature and drive the first plate to be displaced along the first direction, such that the area of the region, where the orthographic projections of the first plate and the second plate on the base substrate overlap each other, is changed.

6. The adjustable capacitor according to claim 5, wherein the second elastic component comprises a plurality of second elastic sub-members arranged at intervals, two ends of each of the plurality of second elastic sub-members are connected to the second connecting arm and the first plate, respectively, and the second elastic sub-member is configured to stretch or contract along the first direction in response to that the operating environment reaches the specific temperature.

7. The adjustable capacitor according to claim 5, wherein for any one of the at least one capacitor unit, a width of the first plate in the first direction is W1, and a width of the second plate in the first direction is W2; in response to that the temperature of the operating environment does not reach the specific temperature, the region where the orthographic projections of the first plate and the second plate on the base substrate overlap each other is a first region; a width of the first region in the first direction is W3; in response to that the temperature of the operating environment does not reach the specific temperature, a deformation amount of the second elastic component is S2, S2≤W1−W3, and S2≤W2−W3.

8. The adjustable capacitor according to claim 1, wherein, for any one of the at least one capacitor unit, the first connecting arm is spaced from the second plate in a first direction; the second plate is connected to the first connecting arm through the first elastic component, the first elastic component is configured to deform in response to that the operating environment reaches the specific temperature and drive the second plate to rotate in a plane parallel to the base substrate, such that the area of the region, where the orthographic projections of the first plate and the second plate on the base substrate overlap each other, is changed.

9. The adjustable capacitor according to claim 8, wherein for any one of the at least one capacitor unit, the first elastic component comprises a plurality of first elastic sub-members arranged at intervals, two ends of each of the plurality of first elastic sub-members are connected to the first connecting arm and the second plate, respectively, and the first elastic sub-member is configured such that a radian of the first elastic sub-member changes in response to that the operating environment reaches the specific temperature.

10. The adjustable capacitor according to claim 8, wherein for any one of the at least one capacitor unit, the first elastic component comprises a plurality of first elastic sub-members arranged at intervals, two ends of each of the plurality of first elastic sub-members are connected to the first connecting arm and the second plate, respectively, and a part of the plurality of first elastic sub-members are configured such that a radian of the first elastic sub-member changes in response to that the operating environment reaches the specific temperature; and the other part of the plurality of first elastic sub-members are configured to stretch or contract in the first direction in response to that the operating environment reaches the specific temperature.

11. The adjustable capacitor according to claim 1, wherein for any one of the at least one capacitor unit, the first plate is connected to the second connecting arm through the second elastic component, and the second connecting arm is spaced from the first plate in a first direction; the second elastic component is configured to deform in response to that the operating environment reaches the specific temperature and drive the first plate to rotate in a plane parallel to the base substrate, such that the area of the region, where the orthographic projections of the first plate and the second plate on the base substrate overlap each other, is changed.

12. The adjustable capacitor according to claim 11, wherein for any one of the at least one capacitor unit, the second elastic component comprises a plurality of second elastic sub-members arranged at intervals, two ends of each of the plurality of second elastic sub-members are connected to the second connecting arm and the first plate, respectively, and the second elastic sub-member is configured such that a radian of the second elastic sub-member changes in response to that the operating environment reaches the specific temperature.

13. The adjustable capacitor according to claim 11, wherein for any one of the at least one capacitor unit, the second elastic component comprises a plurality of second elastic sub-members arranged at intervals, two ends of each of the plurality of second elastic sub-members are connected to the second connecting arm and the first plate, respectively, and a part of the plurality of second elastic sub-members are configured such that a radian of the second elastic sub-member changes in response to that the operating environment reaches the specific temperature; and the other part of the plurality of second elastic sub-members are configured to stretch or contract in the first direction in response to that the operating environment reaches the specific temperature.

14. The adjustable capacitor according to claim 1, wherein the first connecting arm comprises a first pedestal electrode and a first anchor sequentially stacked in a direction away from the base substrate, and the first elastic component is connected to the first anchor.

15. The adjustable capacitor according to claim 1, wherein the first plate is connected to the second connecting arm through the second elastic component, the second connecting arm comprises a second pedestal electrode and a second anchor sequentially stacked in a direction away from the base substrate, and the second elastic component is connected to the second anchor.

16. The adjustable capacitor according to claim 1, wherein the second plate is connected to the first connecting arm through the first elastic component, and the first elastic component is made of a shape memory alloy material, and/or the first plate is connected to the second connecting arm through the second elastic component, and the second elastic component is made of a shape memory alloy material.

17. The adjustable capacitor according to claim 1, wherein for any one of the at least one capacitor unit, the capacitor unit further comprises an interlayer dielectric layer covering the first plate, and a dielectric constant of a material of the interlayer dielectric layer varies with electric field strength.

18. The adjustable capacitor according to claim 1, wherein the at least one capacitor unit comprises a plurality of capacitor units, and the first connecting arms of the plurality of capacitor unit are connected together to form a one-piece structure.

19. An electronic apparatus, comprising a high-frequency tuning circuit and an automatic frequency fine tuning circuit, each of which comprises the adjustable capacitor according to claim 1.

* * * * *